United States Patent Office 3,293,096
Patented Dec. 20, 1966

3,293,096
OIL ABSORPTIVE LAMINATES
John C. Pitzer, Cincinnati, Ohio, assignor to Formica Corporation, Cincinnati, Ohio, a corporation of Delaware
No Drawing. Filed Nov. 30, 1962, Ser. No. 241,150
8 Claims. (Cl. 156—155)

This invention relates to novel laminated articles. More particularly, this invention relates to novel thermoset aminoplast resin-impregnated laminated articles characterized by improved oil absorption as compared to conventionally prepared thermoset resin-impregnated laminates, and further relates to methods of producing these oil-absorptive laminated articles. In addition, this invention relates to strong, lightweight, oil-absorptive articles of manufacture comprising my novel thermoset aminoplast resin-impregnated laminated articles which are especially suited for use in difficultly accessible or inaccessible locations.

Many articles of manufacture which are subject to friction when in use and which, as a result, normally require in-service lubrication, such as ball bearing retains or separators, thrust washers, and the like, are frequently installed in locations where such lubrication is difficult or even impossible to perform. In such cases, lubrication prior to installation is all that is possible. As can be readily appreciated, this can give rise to serious problems. For example, in the case of a ball bearing retainer or separator fabricated from a relatively non-absorbing material such as non-porous metal or conventionally prepared thermoset resin-impregnated laminated tubing, lubrication prior to installation merely results in surface adsorption of small quantities of lubricant which are quickly dissipated in service, lending to failure of the bearing and, in many cases, to replacement of an entire assembly.

Due to the problems connected with the use of these conventionally prepared thermoset resin-impregnated laminated articles and non-porous metal articles in locations where in-service lubrication is difficult or impossible, it has long been accepted practice to fabricate articles of the type in question from sintered metal, which can absorb quantities of lubricant sufficient to provide for long term lubrication of the article while in use in an inaccessible location. However, aside from the difficulties involved in fabricating sintered metal articles, another of their disadvantages is that they are fairly heavy for their size, much heavier, in fact, than the corresponding size article prepared from a thermoset resin-impregnated laminate. This too can pose serious practical difficulties, particularly if these sintered metal articles are used where weight is an important consideration, e.g., in airplanes, missiles, and the like. Thus, in many cases the use of self-lubricating sintered metal articles can create as many problems as it solves.

I have now prepared strong, lightweight, oil-absorptive thermoset aminoplast resin-impregnated laminated articles for use in difficulty accessible or inaccessible locations which avoid the problems inherent in the corresponding sintered metal articles while also providing a degree of in-service self-lubrication not possible using the corresponding conventionally prepared thermoset resin-impregnated laminated articles or nonporous metal articles. More particularly, the present invention involves the preparation of oil-absorptive thermoset aminoplast resin-impregnated laminated articles by means of a sequence of steps which comprises:

(A) Impregnating a base material, e.g., fine weave cotton fabric, with a solution of a substantially water-insoluble leachable solid material, e.g., pentachlorophenol, in an inert organic solvent for said solid material, and then drying the resulting impregnated base material, (B) Impregnating the dried, leachable solid-impregnated base material with an aqueous solution or syrup of a water-soluble thermosetting aminoplast resin and then drying the resulting doubly-impregnated base material, (C) Curing the thermosetting aminoplast resinous impregnant of the dried, doubly-impregnated base material, said base material being in a desired configuration, e.g., a curved or planar laminate, a tube, or the like, to produce a thermoset aminoplast resin-impregnated laminated article, and (D) Dissolving the leachable solid material from said laminated article, e.g., by contacting it with an organic solvent for a period of time sufficient to extract substantially all, or at least a substantial amount, of the leachable solid material from the article.

It is, therefore, an object of my invention to provide novel laminated articles.

It is also an object of my invention to provide novel thermoset aminoplast resin-impregnated laminated articles characterized by improved oil absorption as compared to conventionally prepared thermoset resin-impregnated laminates.

A further object of my invention is to provide strong, lightweight, oil-absorptive articles of manufacture comprising my novel thermoset aminoplast resin-impregnated laminated articles which are especially suited for use in difficulty accessible or inaccessible locations.

An additional object of my invention is to provide methods of producing these oil-absorptive laminated articles.

These and other objects of my invention will be discussed more fully hereinbelow.

The base materials employed in practicing the present invention do not differ from those used in preparing conventional thermoset resin-impregnated industrial laminates. Thus, a wide variety of resin-absorbing materials can be used, including woven and non-woven fibrous sheets prepared from α-cellulose or regenerated cellulose fibers, e.g., kraft paper, or from glass or asbestos fibers, or from other natural or synthetc fibers such as cotton, wool, acrylonitrile homo- and copolymers, polyesters, and the like, as well as mixtures of such fibers, e.g., a mixture of cellulosic and cotton fibers, with sheets prepared from cotton fabric being preferred.

The leachable solid material used to impregnate the base material can be any solid material, organic or inorganic, crystalline or non-crystalline, or mixtures thereof, preferably one having a melting point above about 100° C., which is soluble in common organic solvents, e.g., alcohols, ketones, aromatic hydrocarbons and the like, at least to the extent necessary to give a treating solution having a dissolved solids concentration at room temperature, i.e., at about 25° C., of about 5% or greater and substantially insoluble in water. The leachable solid material should not substantially affect the cure of the thermosetting aminoplast resin. In addition, the leachable solid material should be substantially non-reactive with the thermosetting aminoplast resin under the conditions employed when impregnating the leachable solid material-impregnated base material with said resin as well as those employed when subsequently drying the doubly-impregnated base material and curing the resinous impregnant, inasmuch as a substantial amount of co-reaction between the leachable solid material and the resin will prevent the solid material from being dissolved from the article following the cure of the resin to a substantially insoluble and infusible state. Similarly, the organic solvent used to dissolve the leachable solid material should be substantially non-reactive with the thermosetting aminoplast resin under impregnating conditions.

Included among the organic solvent-soluble, substantially water-insoluble leachable solid materials which may be used to impregnate the base material are acetanilide, 2,4 - dinitroacetanilide, 2,5 - dihydroxyacetophenone, 1-bromo-4-nitrobenzene, 1,4-diiodobenzene, hexamethylbenzene, 7 - chloro-1-nitronaphthalene, 1,3,5 - trinitronaphthalene, 1-methylphenanthrene, 9-phenanthrol, pentachlorophenol, salicylanilide, and the like, as well as mixtures thereof.

The solution of the organic solvent-soluble, substantially water-insoluble leachable solid material used to impregnate the base material prior to the impregnation of said base material with the aqueous solution of the thermosetting aminoplast resin will be prepared by dissolving the leachable solid material in a normally liquid organic solvent therefor, preferably one having a boiling point not greater than about 150° C. A partial listing of such solvents includes monohydric alcohols, e.g., methanol, ethanol, isopropanol, and the like, ketones such as acetone, methyl ethyl ketone, methyl isopropyl ketone, diethyl ketone, ethyl propyl ketone, dipropyl ketone, and the like, ethers such as diethyl ether, ethyl propyl ether, and the like, and aromatic compounds such as benzene, toluene, xylene, and the like. As might be expected, mixtures of these solvents can also be employed, and in some cases will even be preferred.

As previously indicated, when impregnating the base material with the leachable solid material, the latter should be present in organic solution in an amount which constitutes at least about 5% by weight of the solution. In most cases, however, the solution will have a solids content ranging from about 10% to about 25% or more by weight, based on the total weight of the solution. It should be noted that these are practical limitations rather than critical ones, inasmuch as they merely provide organic solutions with which the base material can be satisfactorily impregnated with a minimum of treatment.

The water-soluble thermosetting aminoplast resins employed in practicing the present invention are synthetic resins prepared by the condensation reaction of an amino (including imino) or amido (including imido) compound with an aldehyde.

Resinous condensates of this type, as well as methods for their preparation, have been described innumerable times in the prior art, and adequate disclosures of them may be found in, for example, U.S. Patents Nos. 2,197,357, 2,310,004 and 2,328,592 to Widmer et al. and 2,260,239 to Talbot. Particularly preferred are aminoplast resins of the type wherein a mol of one or more aminotriazines containing at least two amidogen groups, each having at least one aldehyde-reactable hydrogen atom attached to the amidogen nitrogen atom, e.g., melamine, has been reacted with from about 1 to about 6 mols, and preferably from about 2 to about 3 mols, of an aldehyde, such as formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products used in practicing the present invention, but other aminotriazines, e.g., mono-, di- and tri-substituted melamines, such as the mono-, di- and trimethylmelamines, and the like; guanamines, such as formoguanamine, acetoguanamine, benzoguanamine, and the like, as well as mixtures of aminotriazines, may be utilized as reactants. Similarly, formaldehyde, preferably in aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine, and the like may also be employed.

The particular properties desired in the thermosetting resin, aside from water-solubility and substantial insolubility in organic solvents, and in the final product, as well as economic considerations, are among the elements which will determine the choice of the particular aminotriazine and aldehyde employed.

I may also employ other amido or imido compounds having at least two aldehyde-reactable hydrogen atoms attached to amidogen nitrogen atoms in addition to or insted of an aminotriazine in preparing the thermosetting aminoplast resin. For example, I may employ urea and those of its derivatives which have been commonly used in the preparation of aminoplast resinous compositions, such as, for example, the alkylureas, e.g., mono- and dimethylurea, haloureas, and the like.

The properties of these thermosetting aminoplast resins can be further modified, if desired, by incorporating various other substances therein. Included among such substances are the α-alkyl-D-glucosides, e.g., α-methyl-D-glucoside, disclosed in U.S. Patent No. 2,773,848 to Lindenfelser, methylol derivatives corresponding to the general formula:

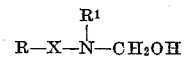

wherein R represents an alkyl, aryl or aralkyl group, $R^1$ represents a hydrogen atom or an alkyl, alkylol, aryl or acyl group, and X represents —SO₂ or

e.g., N-methylol p-toluenesulfonamide (which may be formed in situ by the addition of p-toluenesulfonamide to the amidogen-formaldehyde reaction mixture) and the like, combinations of these glucosides and methylol derivatives, e.g., a mixture of α-methyl-D-glucoside and p-toluenesulfonamide, as disclosed in U.S. Patent No. 2,773,788 to Magrane et al., and amines, including monoamines such as triethyl amine, triethanolamine, tris(hydroxymethyl)-aminomethane, and the like, and alkylene polyamines and polyalkylene polyamines such as 3,3'-iminobispropylamine and the like. When such modifications are carried out, the modifiers themselves will generally be considered as part of the total resin solids, inasmuch as in most cases they will not volatilize or leach out of the resin during subsequent treating steps and thus they will become part of the resin system.

The resin solids content of the aqueous solution of thermosetting aminoplast resin employed to impregnate the base material subsequent to impregnation with the organic solution containing the leachable solid material can range from about 35% to about 60% by weight, and preferably from about 40% to about 45% by weight, based on the total weight of the aqueous solution.

The base material can be impregnated to give the desired solids content of leachable solid material and thermosetting aminoplast resin by means of one or several treatments with the respective impregnating solutions, using such methods as dipping, roll coating, spraying, and the like. In the case of the leachable solid material, impregnation will be carried out to give a solids content ranging from about 5% to about 35% by weight, and preferably from about 10% to about 20% by weight, based on the dry weight of the impregnated base material. Following impregnation, the sheet is dried, preferably at elevated temperatures using a forced hot air drying oven, infrared heating means, or the like, to a volatile content of less than about 4% by weight, based on the weight of the dried, impregnated base material. The dried, impregnated base material will then be impregnated with the thermosetting aminoplast resin to give a resin solids content ranging from about 35% to about 65% by weight, and preferably from about 50% to about 60% by weight, based on the dry weight of the doubly-impregnated base material, and then dried to a volatile content of less than about 10% by weight, based on the weight of the dried, doubly-impregnated base material.

Conventional laminating techniques, involving consolidation by means of heat alone or heat and pressure, are employed in preparing laminates from the dried, doubly-impregnated base material. For example, one or several sheets of this material can be placed between press plates and heat-treated in a laminating press, e.g., at a temperature of from about 125° C. to about 170° C. under a pressure of from about 50 p.s.i. to about 1400 p.s.i. for from about 30 minutes to about 6 hours or more, depending on the particular aminoplast resin used, the thickness of the laminate, etc., to convert the thermosetting aminoplast resinous impregnant thereof to a substantially insoluble and infusible state. In addition to curved or planar laminates prepared by pressing, tubing can be prepared by any conventional method, for example by convolutely winding a sheet or sheets of the dried, doubly-impregnated base material around a cylindrical mandrel, preferably one which is heated to a temperature of from about 120° C. to about 160° C., to achieve a desired thickness, next rolling the impregnated base material on the mandrel between pressure rolls for from about 30 seconds to about 60 minutes or more, depending on the particular aminoplast resin used, the thickness and diameter of the tube, etc., preferably using rolls which are heated to a temperature of from about 120° C. to about 160° C. so as to exert tension on the material wound on the mandrel, then heating the impregnated base material on the mandrel, e.g., by oven-baking at a temperature of from about 120° C. to about 160° C. for from about 90 minutes to about 8 hours or more, again depending on the particular aminoplast resin used, the thickness and diameter of the tube, etc., and finally removing the impregnated tubing from the mandrel and further heat-treating it at a temperature of from about 120° C. to about 160° C. for from about 2 hours to about 8 hours to insure dimensional stability in the tubing. For larger diameter tubing an oil soak treatment, carried out by immersing the tubing for from about 12 hours to about 48 hours in oil heated to a temperature of from about 90° C. to about 120° C. or higher, may precede the aforementioned heat-treatment to impart even greater dimensional stability to the tubing.

The leachable solid material can be extracted from the thus-produced laminated articles by merely steeping them in an organic solvent for said solid. Included among such solvents are the alcohols, ketones, ethers and aromatic compounds listed above in connection with the impregnating solutions containing leachable solid materials. The solvent can, if desired, be heated to temperatures up to its boiling point for as long as is necessary to insure removal of substantially all of the solid material or at least a substantial amount thereof, e.g., 75% or more. This removal of the leachable solid material can be accomplished either before or after the laminates are fabricated to their final shapes, e.g., either before or after laminated tubing is cut up into ball bearing retainer rings and the holes for the ball bearings drilled therein. The laminates can be fabricated to provide a wide variety of shapes and sizes. For example, besides ball bearing retainer rings, laminated tubing prepared according to the practice of the present invention can be shaped and machined into retainer rings for cylindrical bearings, tapered bearings, and the like.

In order that those skilled in the art may more fully understand the inventive concept presented herein, the following examples are set forth. These examples are given solely by way of illustration and should not be considered as expressing limitations unless so set forth in the appended claims. All parts and percentages are by weight, unless otherwise stated.

*Example I*

A sheet of commercially available fine weave cotton fabric having a weight of four yards per pound and a thread count of 80 x 80 was passed through a treating tank containing a 10% solution of pentachlorophenol in ethanol to impregnate the fabric throughout with pentachlorophenol. Following this impregnation, the wet fabric was dried in a forced hot air oven at a temperature of approximately 120° C. for 8 minutes. The resulting dried, impregnated sheet had a volatile content of 4% and contained 12% of pentachlorophenol, based on the dry weight of the impregnated fabric.

Next, the dried, impregnated sheet was passed through a treating tank containing an aqueous solution of a tris-(hydroxymethyl)aminomethane - modified thermosetting melamine-formaldehyde resin having a mol ratio of formaldehyde:melamine of 1.6:1, respectively, and a resin solids content of 40%, prepared as described in U.S. Patent No. 3,033,833 to Malashevitz et al. The wet, doubly-impregnated (with pentachlorophenol and resin) fabric was then dried in a forced hot air oven at a temperature of 120° C. to a volatile content of 9.7% and a flow of 25.7%, each based on the dry weight of the doubly-impregnated fabric. The resin pickup was found to be 58.9%, again based on the dry weight of the doubly-impregnated fabric.

The dried, doubly-impregnated sheet was then formed into a thermoset aminoplast resin-impregnated laminated tube by first convolutely winding it around a 1⅝ inch cylindrical mandrel which was heated to a temperature of 150° C., next rolling the fabric-wound mandrel at a speed of 5 feet per minute between pressure rolls heated to 160° C. to exert tension on the fabric, then oven-baking the fabric-wound mandrel for five hours at 120° C., and finally removing the tube from the mandrel and post-curing the tube by oven-baking it for an additional six hours at 130° C. to insure dimensional stability in the final fabricated ball bearing retainer rings.

Next, after grinding the tube to an outside diameter of 2 3/16 inches, it was machined to an outside diameter of 2 inches and an inside diameter of 1¾ inches. The machined tube was then cut into rings, each 0.5 inch in length, and holes were drilled through each ring to permit it to receive ball bearings.

The resulting retainer rings were weighed, then boiled in ethanol for 4 hours. Next, after removing the rings from the ethanol and wiping them dry, they were stored in a dry room at 50° C. for 24 hours. At this point, the rings were found to have lost an average of 0.6% in weight. Finally, the rings were immersed in lubricating oil at room temperature for 5 days, following which they were removed from the oil, wiped dry, and then re-weighed. The rings were found to have gained an average of 6.6% in weight, based on the weight of the rings prior to immersion in the oil. In contrast to this, rings prepared in the same manner from fine weave cotton fabric which had not been impregnated with pentachlorophenol prior to being impregnated with the thermosetting aminoplast resin gained an average of only 0.21% in weight after immersion for 5 days at room temperature in the oil.

*Examples II–VIII*

In each of these examples the procedure of Example I was again repeated in every detail except for the following. In the first three (Examples II–IV), the 10% solution of pentachlorophenol in ethanol used in Example I to provide the leachable solid impregnant in the base material was replaced by a 10% solution of salicylanilide in ethanol, a 10% solution of acetanilide in methanol and a 20% solution of 1,4-diiodobenzene in diethyl ether, respectively. In the remaining four examples, the respective solutions of leachable solid materials employed in Examples I–IV were again used, and in addition the melamine-formaldehyde resin used in Example I was replaced in each case by an aqueous solution of a commercially available thermosetting melamine-formaldehyde resin having a mol ratio of formaldehyde:melamine of 2:1, respectively, and a resin solids content of 45%. In every case the resulting ball bearing retainer rings were highly oil-absorptive.

It will be obvious to those skilled in the art that other changes and variations can be made in carrying out the present invention without departing from the spirit and scope thereof as defined in the appended claims.

I claim:

1. A process for the preparation of an oil-absorptive laminated article which comprises (1) impregnating a porous base material with a solution of a substantially water-insoluble leachable solid material in a chemically inert organic solvent, (2) drying the resulting impregnated base material, (3) impregnating the resulting dried, leachable solid material-impregnated base material with an aqueous solution of a thermosetting aminoplast resin, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said aminoplast resin to a substantially insoluble and infusible form, and (7) contacting the resulting laminated article with a solvent for said leachable solid material to dissolve a substantial amount of said material therefrom.

2. A process for the preparation of an oil-absorptive laminated article which comprises (1) impregnating a porous base material with a solution of a substantially water-insoluble leachable solid material in a chemically inert organic solvent, (2) drying the resulting impregnated base material, (3) impregnating the resulting dried, leachable solid material-impregnated base material with an aqueous solution of a thermosetting aminotriazine-aldehyde resin, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said aminotriazine-aldehyde resin to a substantially insoluble and infusible form, and (7) contacting the resulting laminated article with a solvent for said leachable solid material to dissolve a substantial amount of said material therefrom.

3. A process for the preparation of an oil-absorptive laminated article which comprises (1) impregnating a porous base material with a solution of pentachlorophenol in a chemically inert organic solvent, (2) drying the resulting impregnated base material, (3) impregnating the resulting dried, pentachlorophenol-impregnated base material with an aqueous solution of a thermosetting melamine-formaldehyde resin, (4) drying the resulting doubly-impregnated base material, (5) assembling a plurality of layers of said dried, doubly-impregnated base material in superimposed relationship, (6) laminating the resulting dried, doubly-1impregnated base material, by the application of heat thereby curing said melamine-formaldehyde resin to a substantially insoluble and infusible form, and (7) contacting the resulting laminated article with a solvent for said pentachlorophenol to dissolve a substantial amount of pentachlorophenol therefrom.

4. A process for the preparation of an oil-absorptive laminated article which comprises (1) impregnating a porous base material with a solution of salicylanilide in a chemically inert organic solvent (2) drying the resulting impregnated base material, (3) impregnating the resulting dried, salicylanilide-impregnated base material with an aqueous solution of a thermosetting melamine-formaldehyde resin, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said melamine-formaldehyde resin to a substantially insoluble and infusible form, and (7) contacting the resulting laminated article with a solvent for said salicylanilide to dissolve a substantial amount of salicylanilide therefrom.

5. A process for the preparation of an oil-absorptive laminated article which comprises (1) impregnating a porous base material with a solution of pentachlorophenol in a chemically inert organic solvent, said solution having a solids content at 25° C. of at least about 5%, (2) drying the resulting impregnated base material, (3) impregnating the resulting dried, pentachlorophenol-impregnated base material with an aqueous solution of a thermosetting melamine-formaldehyde resin, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said melamine-formaldehyde resin to a substantially insoluble and infusible form, and (7) contacting the resulting laminated article with a solvent for said pentachlorophenol to dissolve a substantial amount of pentachlorophenol therefrom.

6. A process for the preparation of an oil-absorptive laminated article which comprises (1) impregnating a porous base material with a solution of salicylanilide in a chemically inert organic solvent, said solution having a solids content at 25° C. of at least about 5%, (2) drying the resulting impregnated base material, (3) impregnating the resulting dried, salicylanilide-impregnated base material with an aqueous solution of a thermosetting melamine-formaldehyde resin, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said melamine-formaldehyde resin to a substantially insoluble and infusible form, and (7) contacting the resulting laminated article with a solvent for said salicylanilide to dissolve a substantial amount of salicylanilide therefrom.

7. A process for the preparation of an oil-absorptive laminated article which comprises (1) impregnating a porous cellulosic base material with a solution of pentachlorophenol in a chemically inert organic solvent, said solution having a solids content at 25° C. of at least about 5%, (2) drying the resulting impregnated base material, (3) impregnating the resulting dried, pentachlorophenol-impregnated base material with an aqueous solution of thermosetting melamine-formaldehyde resin, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said melamine-formaldehyde resin to a substantially insoluble and infusible form, and (7) contacting the resulting laminated article with a solvent for said pentachlorophenol to dissolve a substantial amount of pentachlorophenol therefrom.

8. A process for the preparation of an oil-absorptive laminated article which comprises (1) impregnating a porous cellulosic base material with a solution of salicylanilide in a chemically inert organic solvent, said solution having a solids content at 25° C. of at least about 5%, (2) drying the resulting impregnated base material, (3) impregnating the resulting dried, salicylanilide-impregnated base material with an aqueous solution of a thermosetting melamine-formaldehyde resin, (4) drying the resulting doubly-impregnated base material, (5) assembling a plurality of layers of said dried, doubly-impregnated base material in superimposed relationship, (6) laminating the resulting dried, doubly-impregnated base material, by the application of heat thereby curing said melamine-formaldehyde resin to a substantially insoluble and infusible form, and (7) contacting the resulting laminated article with a solvent for said salicylanilide to dissolve a substantial amount of salicylanilide therefrom.

References Cited by the Examiner

UNITED STATES PATENTS

| | | | |
|---|---|---|---|
| 2,708,611 | 5/1955 | Harkenrider | 308—243 |
| 2,728,619 | 12/1955 | Haller | 308—240 |
| 2,772,995 | 12/1956 | Wilson. | |
| 2,964,094 | 7/1960 | Kawaski | 264—49 |
| 3,104,174 | 9/1963 | Harris | 117—4 |

EARL M. BERGERT, *Primary Examiner.*

R. I. SMITH, M. L. KATZ, *Assistant Examiners.*